United States Patent [19]

Krohn et al.

[11] 4,080,051
[45] Mar. 21, 1978

[54] PREPARATION OF PHOTOCHROMIC GRADIENT LENSES OF COSMETICALLY IMPROVED COLOR

[75] Inventors: David A. Krohn, Southbridge, Mass.; Emil W. Deeg, Woodstock, Conn.

[73] Assignee: American Optical Corporation, Southbridge, Mass.

[21] Appl. No.: 668,173

[22] Filed: Mar. 18, 1976

[51] Int. Cl.² ............................. G02C 7/10; G02B 5/23
[52] U.S. Cl. ................................. 351/165; 65/DIG. 2; 106/47 Q; 106/52; 106/54; 106/DIG. 6; 350/354
[58] Field of Search ................. 351/165; 350/160 P; 65/DIG. 2; 106/DIG. 6, 47 Q, 52, 54

[56] References Cited

U.S. PATENT DOCUMENTS

| | | | |
|---|---|---|---|
| 2,675,740 | 4/1954 | Barkley | 351/165 X |
| 3,197,296 | 7/1965 | Eppler et al. | 106/DIG. 6 X |
| 3,208,860 | 9/1965 | Armistead et al. | 350/160 P X |
| 3,255,026 | 6/1966 | Stroud | 65/DIG. 2 X |
| 3,419,370 | 12/1968 | Cramer et al. | 351/165 X |
| 3,892,582 | 7/1975 | Simms | 106/52 |
| 3,920,463 | 11/1975 | Simms | 106/54 |
| 3,957,499 | 5/1976 | De Munn et al. | 106/54 |

FOREIGN PATENT DOCUMENTS

| | | | |
|---|---|---|---|
| 739,404 | 7/1966 | Canada | 350/160 P |
| 2,107,343 | 10/1971 | Germany | 106/DIG. 6 |
| 2,107,344 | 10/1971 | Germany | 106/47 Q |
| 1,380,781 | 1/1975 | United Kingdom | 350/160 P |

OTHER PUBLICATIONS

"Photogray Glass for Ophthalmic Lenses", Corning Tech. Bulletin, July 1970, 8 pp. & cover.

*Primary Examiner*—Paul A. Sacher
*Attorney, Agent, or Firm*—William C. Nealon; Howard R. Berkenstock, Jr.

[57] ABSTRACT

Glass lenses, or lens blanks, containing all the ingredients necessary to produce phototropic, or photochromic, behavior, are treated in a conventional production furnace to produce a locally variable heat treatment, wherein at least one portion thereof is raised to a temperature exceeding the glass strain point but not the softening point, and other portions are heated to variable temperature decreasing from the strain point. The treatment causes development of phototropic, or photochromic, behavior only in those portions of the lenses, or lens blanks, exposed to the temperature above the strain point. The lenses resulting are characterized by trichromatic coefficients, $x=0.306$ and $y=0.307$, in the unactivated state and $x=0.324$ and $y=0.321$, in an activated state and including a small but effective quantity of cobalt oxide.

4 Claims, 3 Drawing Figures

SCHEMATIC REPRESENTATION OF APPEARANCE OF A PLANO LENS AND CORRESPONDING VISUAL TRANSMITTANCE ALONG CENTER LINE OF THE SAME LENS BEFORE <u>A</u> AND AFTER <u>B</u> EXPOSURE TO SUNLIGHT.

SCHEMATIC REPRESENTATION OF APPEARANCE OF A PLANO LENS AND CORRESPONDING VISUAL TRANSMITTANCE ALONG CENTER LINE OF THE SAME LENS BEFORE A AND AFTER B EXPOSURE TO SUNLIGHT.

PREPARATION OF PHOTOCHROMIC GRADIENT LENSES OF COSMETICALLY IMPROVED COLOR

This invention relates to lenses, or lens blanks, having gradations in phototropic, or photochromic, qualities characterized by improved color in the activated and unactivated states.

This invention provides improvement in lenses, and lens blanks, of the type fully set forth in copending patent application Ser. No. 624,688, filed Oct. 22, 1975 for Photochromic Gradient Lenses, assigned to the Assignee of the present application.

BACKGROUND OF THE INVENTION

The copending application, identified above, sets out fully the background of the invention and prior art of this invention. The following description briefly sets out some of the background and prior art of the invention, set out in said copending application;

Ophthalmic lenses serve basically three purposes:
(1) correction of vision defects;
(2) protection against mechanical hazards to the eye; and
(3) protection against radiation.

The first purpose is accomplished with transparent lenses having refractive powers, and the second purpose is accomplished by providing lenses of the required physical strength. The third purpose of protection against radiation such as ultraviolet light, intense visible light or infrared radiation can be achieved by adding color in or on the glass of the lenses or in or on the plastics of polymers of the lenses.

The colored lenses and their preparation are fully described in the above-entitled copending application.

Permanently colored or dyed ophthalmic lenses have a disadvantage of retaining low transmission of light in low levels in illumination, that is in a more or less dark environment. In such low light environments as nighttime driving, conventional sunglasses may be hazardous. It has been found that this particular disadvantage may be overcome to a certain extent, by the many varieties of phototropic or photochromic commercially available glass or plastic lenses. U.S. Pat. No. 3,197,396 describes phototropic ophthalmic lenses, containing silver ions, which are transparent to visible radiation but will darken to exposure to actinic radiation to where the transmission will be about 45% of the original transmissivity. Some of the other prior art directed to ophthalmic lenses includes U.S. Pat. Nos. 3,208,860; 3,548,060; 3,594,198; 3,617,316; 3,703,388; 3,765,913; 3,795,523; 3,833,511; 3,834,912; British patent 1,275,019; German Pat. No. 2,230,506; and German Auslegeschrift No. 2,256,775.

In addition to the above-mentioned patents on photochromic glasses, all containing silver halide particles uniformly dispersed throughout the volume of an article, it is known that Chance-Pilkington Optical Glass Company, England, is marketing a phototropic phospho-silicate glass under a trade name "Reactolite".

Other photochromic glasses sensitized by silver halides are described in general in the following articles:
W. H. Armistead and S. D. Stookey: "Photochromic Silicate Glasses Sensitized by Silver Halides", SCIENCE, Vol. 144 (1964) pp. 150–154;
G. Gliemeroth and K. H. Mader: "Phototropic Glass" Angew. Chem. Internat. Edit., Vol. 9 (1970) pp. 434–445;
A. V. Dotsenko et al.: "A Study of the Effect of Copper Ions on the Relaxation Properties of Photochromic Glasses", Sov. J. P. Opt. Technol., Vol. 41 (1974) pp. 395–397;
R. T. Araujo: "Photochromic Glasses", Chapter 8 of the book PHOTOCHROMISM edited by G. H. Brown, Willey Interscience, New York (1971) pp. 667–686;
H. Bach and G. Gliemeroth: "Phase Separation in Phototropic Silver-Halide-Containing Glasses", J. Amer. Cer. Soc. (1971) pp. 43–44.

The prior art glasses seem to have in common:
1. the ingredients producing the photochromic or phototropic behavior are silver halide particles uniformly dispersed in a glass matrix; and
2. articles made from these glasses must be exposed to a well defined heat treatment to develop photochromic or phototropic behavior.

The literature described glasses appear to differ from each other in the compositions of the base glasses which serve as carriers for the phototropic or photochromic centers. U.S. Pat. No. 3,208,860 describes a phototropic article comprising a silicate glass body having in at least a portion thereof microcrystals of at least one silver halide selected from the group consisting of silver chloride, silver bromide, and silver iodide, with the concentration of said crystals in the portion being at least 0.005% by volume.

U.S. Pat. No. 3,419,370 teaches a preparation of photochromic lenses by diffusing silver ions into the surface layer of a base glass and then exposing the articles to a specific heat treatment. Glass or plastic articles have also been prepared as photochromic materials by coating the substrates with a phototropic coating as described in U.S. Pat. No. 3,875,321 and described in The Journal of the American Ceramic Society (1974) pps. 332–335 under the title "Reversible Optical Density Changes in Composite Layers".

The photochromic or phototropic lenses above described have certain advantages over permanently tinted lenses. Thus because of the reversibility of the photochromic effect such lenses assume a low transmissivity if exposed to ultraviolet or blue light but resume high transmissivity in an environment where low illumination levels of activating radiation prevail. Glass lenses do not appear to lose photochromic properties as do plastic phototropic lenses during extended wear causing degradation of active ingredients.

All presently known photochromic or phototropic lenses have the disadvantage that recovery of high transmissivity takes several minutes. This has been noticed with discomfort and dislike by wearers under such conditions as driving an automobile where low levels of illumination exist inside the car and high levels of illumination may exist outside the vehicle. While it is desirable to reduce the light intensity to the driver's eyes while observing road and traffic conditions, the driver must be permitted to clearly view information presented by instruments on the vehicle instrument panel where a low level of illumination normally exists. Indeed, it may be dangerous to prevent this. A similar type of problem may be found in occupations where sudden changes in the level of illumination from bright to dim occur either (1) by rapid changes in the intensity of the light source or (2) by movement of the wearer of the spectacles from high level of intensity to a darker environment.

Some of the disadvantages have been overcome by the use of eyeglasses with a continuous variation of transmissivity from low at the top of the lens to high over the lower portion of the lens. Lenses with such a permanent gradient in degree of color or tint are now available in commerce, and it is believed that such lenses are prepared by differentially dyeing plastic lenses or by applying a graded color coating over glass lenses by vacuum deposition of absorbing materials. With plastic lenses such color gradient may be achieved by concentration of the dye absorbed by the lens by different areas. For example, a high concentration of absorption prevails at the top and a low concentration at the bottom of the lens.

In U.S. Pat. No. 3,419,370 there is found a statement that a gradient in photochromic behavior across a glass body is attainable by varying the time and/or temperature at different portions of the glass body exposed to an ion exchange medium. According to this patent the ion exchange bath contains, in all instances, silver ions (see Table 2 of the patent). The gradient in photochromic properties is achieved by causing or allowing different concentrations of silver ions to diffuse into the glass. The teachings of the patent, in our opinion, is that glass cannot be made photochromic or phototropic without having been exposed to the diffusion process in the silver containing ion exchange bath prior to the heat treatment required to develop phototropic or photochromic behavior. The base composition of the glasses do not contain any silver ions, nor is there a teaching of a photochromic gradient over ophthalmic lenses.

In our opinion, the state of the art of making ophthalmic lenses uniformly phototropic or photochromic throughout their entire volume can be summarized as follows:

1. Glasses are melted following procedures known to those skilled in the art of glass making.
2. Lens blanks are made of these glasses by known methods such as pressing or casting.
3. These articles are exposed to a controlled heat treatment to develop silver halide particles of linear dimensions d falling essentially within the range $5 < d < 5$ nm. The lower limit is required to produce photochromic or phototropic behavior, the upper limit to avoid light scattering unacceptable in ophthalmic products. The total concentration of these silver halide particles which are dispersed uniformly throughout the glass article should be at least 0.005 Vol. %.

In our opinion, the state of the art of making glass articles with a gradient in photochromic or phototropic behavior as deduced from U.S. Pat. No. 3,419,370 can be summarized as follows:

1. A base glass having a composition in essence in the general system Alk. Oxide — $Al_2O_3$ — $B_2O_3$ — $SiO_2$, with addition of halides to the batch, is melted under conditions that allow retention of a sufficient quantity of halides.
2. Lens blanks are made from the glasses by known methods such as pressing or casting.
3. Finished lenses are made from the blanks by grinding and polishing.
4. The finished lenses are exposed to a source of silver ions at elevated temperature in such a fashion that in those parts of the lens where a high degree of phototropic or photochromic behavior is desired the silver concentration is higher than in those parts where a low degree of phototropic or photochromic behavior is desired.
5. The thus treated lenses are exposed to a carefully controlled heat treatment to grow silver halide crystals to a size required for photochromic or phototropic behavior, but not exceeding linear dimensions of 50 nm to avoid the light scattering unacceptable in ophthalmic lenses.

Another aspect of photochromic lenses which has not been discussed above is background coloration in both the UV activated and unactivated state. Photochromic lenses of the general type to which this invention relates are characterized by sometimes objectionable coloration. For example, with lenses of the type disclosed and claimed in application Ser. No. 624,688, identified above, there is a "yellowish-brown" background appearance. It has been stated to be impossible to expose an observer to light of a non-spectral quality and expect him to describe coloration in such precise form as to be readily recognized by another person. This is because color recognition, or appreciation, is a sensation and the usual language which we use is inaccurate in describing what each of us perceives to be a color. However, it is possible to describe, or evaluate, color in terms of certain standard or primary stimuli. For example, it has been known for some time that a normal observer can duplicate the effect of any color stimulus by mixing the light from three primary sources in the proper proportions. This general subject is discussed in the publication "Handbook of Colorimetry", prepared by the Staff of The Color Measurement Laboratory, Massachusetts Institute of Technology, under the direction of Arthur C. Hardy, Professor of Optics and Photography, Department of Physics, Massachusetts Institute of Technology, printed in 1936 by the Technology Press, Massachusetts Institute of Technology, Cambridge, Mass. This book, on page 5, part 4, discusses the above and proposes that an unknown color can be specified by tristimulus values, $x$, $y$, and $z$, each representing the amount of one of the primary stimuli. This book develops the relationship $x + y + c = 1$ and then teaches means of graphical presentation of chromaticity wherein by spectrophotometry one obtains the normal curve of percentage "transmittance/reflectance" vs. "wavelength" in nanometers. Values for $x$ and $y$ are determined with a conventional template and plotted on a chart in the manner hereafter described.

As described on page 10 of the book, the graphical presentations of chromaticity are in the nature of maps which conveniently reflect color, its dominant wavelength and purity. It is sometimes called the I.C.I. coordinate system. The system was established at a meeting of the International Commission on Illumination in 1931 wherein representatives of various countries adapted a source having a distribution of energy closely approximating average daylight as an International standard of Illumination to be used (except under special conditions). This standard is known as I.C.I. Illuminant C.

In any event, utilizing the procedures above cursorily described, we did the necessary experimental work and calculations to determine the trichromatic coefficients for prior art photochromic lenses and lenses prepared according to the present invention. The so-called yellowish-brown lenses of the prior art were determined to have, to us, a "yellowish-brown" background appearance vs. a more acceptable gray to gray-brown appearance for the present invention; and, using the I.C.I.

system for identifying color were determined to have the following characteristics:

|  | Ser. No. 624,688 | | This Invention | |
|---|---|---|---|---|
| Unexposed to UV | | | | |
| x | 0.369 | } slight yellow | 0.306 | } slight gray |
| y | 0.344 | | 0.307 | |
| Exposed to UV (5 min) | | | | |
| x | 0.327 | } gray-brown | 0.324 | } gray-brown |
| y | 0..331 | | 0.321 | |

The yellowish-brownish tints are objectionable to many wearers and have an association with tainted material. The more gray to gray-brown is cosmetically more desirable and acceptable to most users.

SUMMARY OF THE INVENTION

Ophthalmic lens pressings which do not exhibit phototropic, or photochromic, behavior are made from glasses containing all necessary ingredients to produce such phototropic, or photochromic, behavior. Such glass is hereafter sometimes referred to as "unnucleated" photochromic glass. This expression is used herein for reasons of simplicity. As clearly pointed out in the copending application, the submicroscopic nuclei required to develop silver halide particles exist in the non-phototropic state of the glass. In other words, the nuclei are so small they cannot be seen with a light microscope since they do not apparently reflect light. Numerically speaking, they have a maximum linear dimension which is less than about 5 nm. As will be recognized by one skilled in the art, these particles are too small to interact with light in the visible spectrum. While the nuclei has not been actually measured, the 5 nm number is chosen as having meaning to one in this art. The pressings are not exposed to the heat treatment required to develop photochromic, or phototropic, behavior. The pressings are transferred or made into lens blanks, the blanks are given a gradient in their phototropic, or photochromic, behavior by exposing them to a temperature gradient field. The exposure is such that one portion of the blank is heated to a temperature to above the strain point but below the temperature of the softening point of the glass, while a distant part of the blank is maintained at a temperature below the strain point.

It has also been found that ophthalmic lenses made from unnucleated glass pressings which have been exposed to the specific heat treatment required to develop photochromic, or phototropic, behavior, can be made into semi-finished or finished lenses having their gradient in their phototropic, or photochromic, behavior across the face of the lens.

It has been found that so-called "one-piece multifocal" or "raised ledge multifocal" glass lenses and progressive power glass lenses with desirable properties can be made with a gradient in the phototropic, or photochromic, behavior since such lens designs are particularly suited to the practice of the present invention. The portion of the lens used for distant vision can be made phototropic, or photochromic, whereas the portion of the lens used for near vision will not have such properties. To achieve such a gradient in photochromic, or phototropic, behavior, raised ledge multifocal lenses, or lens blanks, suitable for subsequent generating and polishing are exposed to a temperature gradient as described below, alternatively, finished lenses may be exposed to a corresponding temperature gradient.

The present invention is applicable to glass lens blanks and lenses which contain all of the ingredients required for producing photochromic, or phototropic, behavior substantially uniformly dispersed throughout the glass body but having silver halide in an unnucleated state, i.e. particles of less size than that required to produce photochromic, or phototropic, behavior. It is preferred to use glasses with a coefficient of expansion below $60 \times 10^{-7}$ per degree C to reduce thermal fracture of lenses and blanks during treatment in the temperature gradient field. However, the invention is not limited to such glasses.

We have discovered, and it is primarily upon this that this invention is predicated, that the yellowish-brown background color discussed above is avoided by using a slightly different glass and including a small but effective amount of an additive. More particularly, we include a small but effective amount of cobalt oxide in the range 0.001 to 0.01 in a borosilicate base glass.

DESCRIPTION OF THE PREFERRED EMBODIMENT

Prior workers have failed to recognize or appreciate that all potentially phototropic, or photochromic, glass articles utilizing silver halide particles to achieve phototropic, or photochromic, behavior can be used to prepare articles with a gradient in that behavior. To produce an extinction coefficient $$K(t, x, y)^1$$

through local variation of the silver concentration the prior workers have used a specially melted glass and subsequent exposure to a silver diffusion process. In contrast we provide a locally variable extinction coefficient through well-controlled development of a proper size distribution of silver halide particles in unnucleated glass initially containing all of the necessary silver and halogen atoms uniformly distributed throughout the entire volume of the glass article. Such a desirable size distribution of silver halide particles is achieved by carefully-controlled exposure to a locally variable temperature field. This can be done with either lens blanks or finished lenses. Such lenses are made of glass which can be described as "potentially photochromic, or phototropic, glass".

[1] $x$ and $y$ are position coordinates and $t$ is time.

While practicing the present invention, care must be taken to avoid thermal fracture of the lenses or lens blanks when they are exposed to a locally variable temperature field. Glasses with a low coefficient of thermal expansion, such as certain borosilicates, are better suited for this application than glasses with a high coefficient of thermal expansion, such as the phosphosilicates. Borosilicate glasses have coefficients of thermal expansion in the range approximately $30°$ to $60 \times 10^{-7}/°$ C. To the best of our knowledge other glasses used commercially as a carrier of matrix for phototropic, or photochromic, centers have coefficients of thermal expansion of $90 \times 10^{-7}/°$ C and above. The higher the coefficient of thermal expansion, the higher the thermal stresses existing in the glass article when they are exposed to a temperature gradient.

Lenses according to this invention were manufactured according to the teachings of application Ser. No. 624,688, a preferred glass composition is that manufactured by the Corning Glass Works and having the following percentage chemical analysis, by weight, on an oxide basis:

TABLE I

| | |
|---|---|
| $SiO_2$ | balance |
| $Al_2O_3$ | 10.5 |
| $ZrO_2$ | 2.0 |
| $Li_2O$ | 2.1 |
| BaO | 6.0 |
| SrO | 0.2 |
| $Na_2O$ | 0.6 |
| NaF | 1.0 |
| NaCl | 1.0 |
| $Ag_2O$ | 0.4 |
| PbO | 5.1 |
| CuO | 0.1 |
| $P_2O_5$ | 0.0 |
| $B_2O_3$ | 18.0 |
| $K_2O$ | 0.0 |
| NaBr | 0.0 |
| MgO | 0.0 |
| CoO | 0.007 |

Glasses according to Table I were manufactured in lenses according to the teachings of application Ser. No. 624,688, as discussed above, and compared with this invention to determine various physical characteristics. Table II below reports the results of those tests.

TABLE II

| | Ser. No. 624,688 | This Invention |
|---|---|---|
| Index | 1.5229 | 1.5227 |
| Strain Point (° C) | 471 | 471 |
| Anneal Point (° C) | 507 | 504 |
| Softening Pt. (° C) | 673 | 676 |
| Coef. of Exp. (/° C × 10$^6$) | 4.9 | 4.3 |
| Density (g/cm$^3$) | 2.49 | 2.54 |

Figure 1:
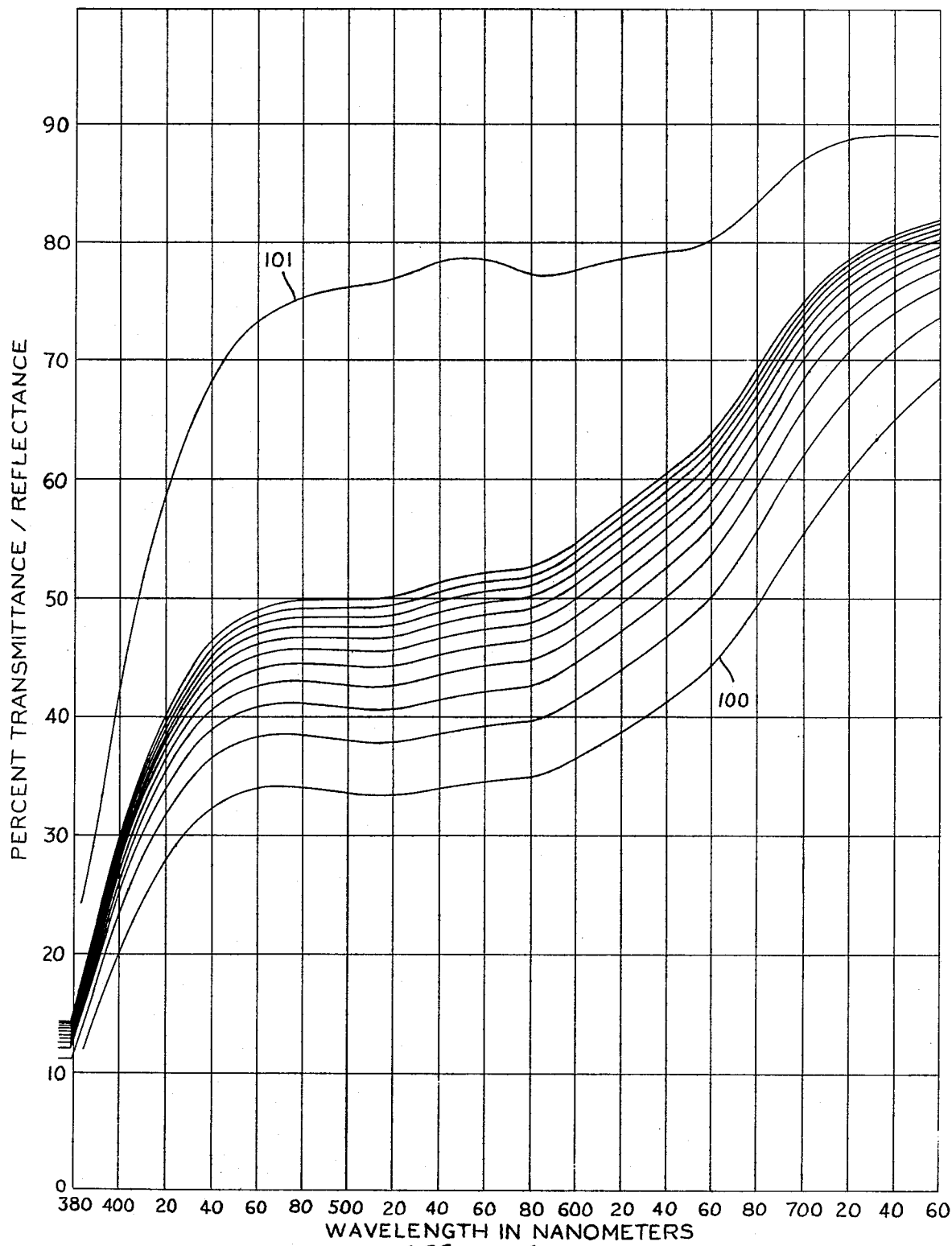
FIG. 1 is a spectrophotometric diagram of the upper portion of a plano lens according to this invention.

Glasses according to this invention were subject to photochromic spectroscopic analysis and the resulting curves are plotted in FIG. 1. In FIG. 1 the lower most curve 100 represents the glasses after five minutes of activation under a conventional ultra-violet lamp. We used a "Blak-Ray" lamp manufactured by Ultra-Violet, Inc.

FIG. 1 is of the upper portion of the lens which includes particles of the largest diameter but progressively changing in size as described elsewhere. The line 101 is that portion in an unactivated state. The line 100 is after 5 minutes of activation. The progressively-spaced lines therebetween were measured at 1 minute intervals during recovery from activation.

The FIG. 1 representation shows, from top to bottom, progressive curves measured at ten minute intervals until substantial transparent recovery in the unactivated state, as shown in curve 101. This set of curves is a "fingerprint" which precisely identifies the glass used. Note FIG. 2 is a curve which was measured over the darker segment of a bifocal fabricated according to the techniques of this invention since it was that portion which included the largest amount of the photochromic material and thus gave the most characteristic results of the test.

Figure 2:
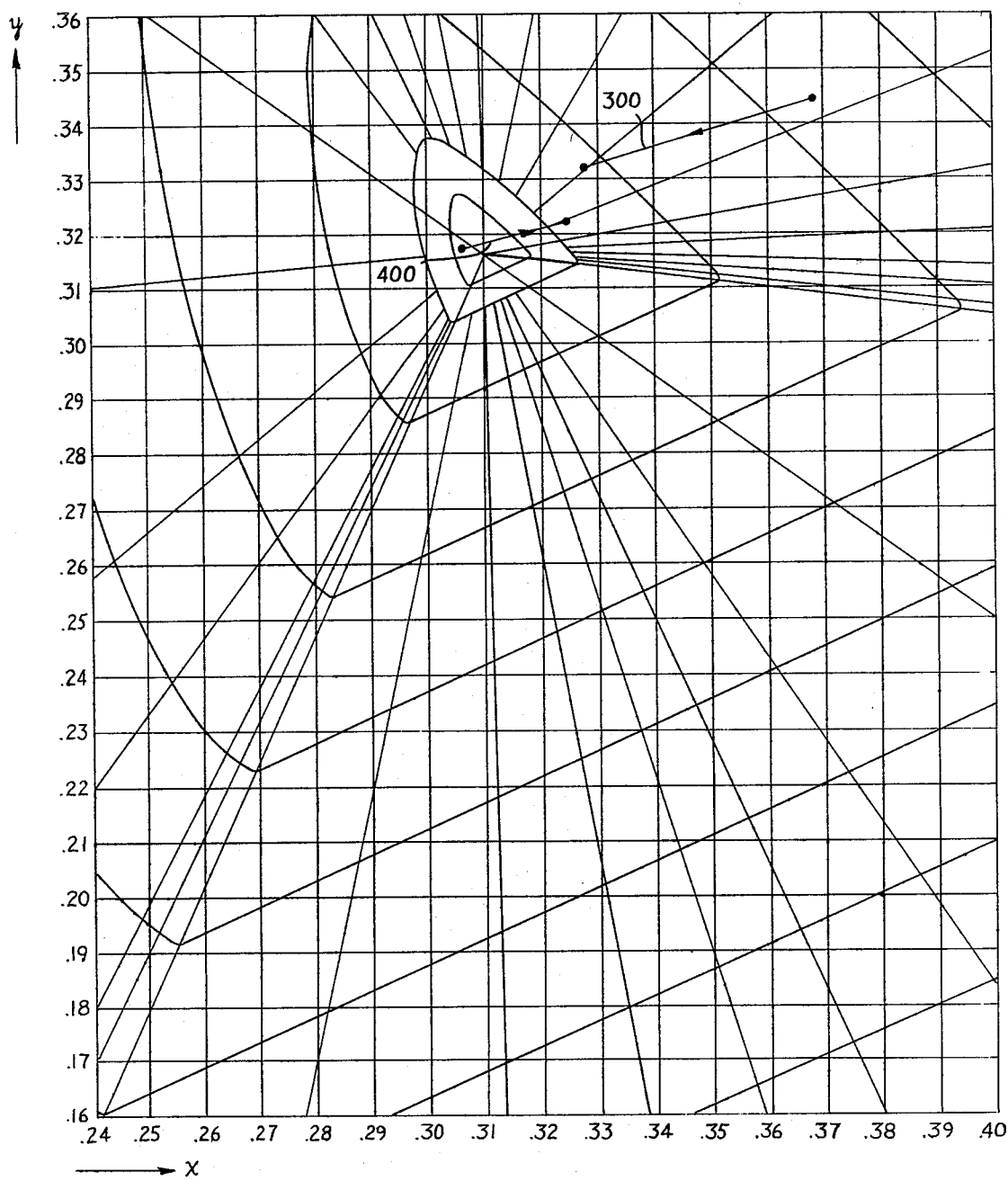
FIG. 2 is an I.C.I. chromaticity diagram, using Illuminant C, illustrating lens coloration according to this invention.

Using a conventional template designed for the purpose, values of x and y were determined from the FIG. 1 curve and the FIG. 2 curve was therefrom plotted. As described in the book "Handbook of Colorimetry" identified above, this curve is an I.C.I. chromaticity diagram using Illuminant C, and illustrates a lens having glasses according to this invention and according to application Ser. No. 624,688. The line 400 is indicative of the lens according to the present invention having an analysis as shown in Table I above. The line 400 is defined by the change in coloration from the unactivated to the activated state, travelling from left to right, as one views the diagram. The line 300, in comparison, is a line indicative of the change in coloration of a lens made according to the teachings of application Ser. No. 624,688 as it moves from the activated to the unactivated state, moving from right to left, on the diagram or chart of FIG. 3.

The primary difference in chemistry between the glass of application Ser. No. 624,688 and the present invention and the means by which the present invention accomplishes its purpose is the small, but effective, amount of cobalt oxide which is added to the glass. Preferably, the cobalt oxide is added in an amount equal to about 0.007 percent by weight.

As can be seen by a study of Table II, the index, strain point, annealing point, and softening point are substantially identical. The coefficient of expansion is significantly different as is the density.

In the foregoing, the silver halide particles are mentioned in linear dimensions. It is understood, however, that in discussing particles being smaller than about 5 nm, and which substantially progressively increase in size to about 50 nm, we are describing an average particle. An "average particle" is defined to mean a substantial preponderance of the particles have the specific linear dimensions. Obviously, some particles will be smaller and some will be larger in any given area because of the lack of precise control of the chemical reactions which result in particle formation. Further, while the photochromic material is described as silver chloride, silver bromide, and silver iodide, the silver composition may also be mixtures of the same.

The glasses used to practice the invention are prepared according to the method of application Ser. No. 624,688. The furnace in which the lenses are heat treated is operated to permit an appropriate temperature above the strain point but below the softening point. An appropriate temperature gradient is provided along the lens. The appropriate temperature gradient permits a potential upper portion of the lens to have well-developed silver halide crystals, with a controlled progression to substantial freedom from nucleation at the bottom or potential bottom of the lenses or lens blanks. This method is accomplished, of course, by assuring that the leading edge of a lens is heated about its strain point but below its softening point, while the opposite portion is heated to a lower temperature. After heating, the lenses are permitted to sufficiently cool to avoid thermal fracture by conventional procedures. Further, conventional grinding, polishing, generating, edging and glazing techniques may be used to prepare and mount the lenses in frames. Suitable conventional strengthening techniques, pursuant to commercial practices, may be used to satisfy government regulations.

Figure 3:
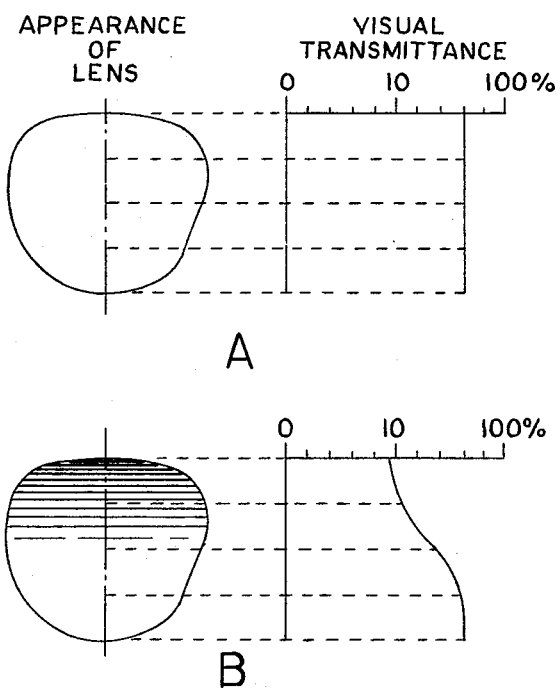
FIG. 3 is a schematic representation of the appearance of a plano lens and the corresponding visual transmittance across the face of such a lens before (a) and after (b) exposure to activating radiation (sunlight) for approximately 30 minutes.

As shown in FIG. 3, section A demonstrates transmittance of a plano lens when in its unactivated condition. Section B illustrates the gradient of transmittance of the lens after it has been exposed to sunlight for a period of time. This schematically shows the results of the lens or lens blank treatment according to the invention.

Broadly speaking, an article fabricated according to the present invention is a lens, or lens blank, exhibiting regressive variation in photochromic behavior from top to bottom as the lens appears in a frame. Distributed throughout the oxide glass body from which the lens, or blank, is fabricated are silver halide particles consisting of about at least 0.005 vol. % thereof. The silver halide particles in the finished lens are of such a size distribution that in at least one portion of the article the linear dimension of the particles are smaller than about 5 nms and their remaining portion of the article range between 5 and 50 nm. Thus, at the top, or through the portion referred to as the distance portion, the particles are relatively large whereas in the lower, or reading portion, of the lens the particles are progressively smaller than about 5 nm. As shown in FIG. 3 there is a schematic representation of a lens prepared according to the present invention, wherein there is a gradation of size of silver halide particles from bottom, having the smallest particles, to the top having the largest particles due to the particular type of heating. In the lens shown in portion A, the lens has not been subjected to actinic light and the visual transmittance is about 75%. After exposure to the activating radiation, or sunlight, for approximately 30 minutes, section B of the representation shows that the transmittance of light through the lens at the top starts at about 10% and extends generally along the transmittance curve to the bottom where there is approximately the same transmission as shown in the bottom for the non-activated lens of Section A. The lenses are further characterized by trichromatic coefficients along the line 400 in FIG. 1. Numerically, the values vary from $x=0.306$ and $y=0.307$ in the unactivated state to $x=0.324$ and $y=0.321$ after being exposed to UV light for five minutes.

Having thus described our invention in detail with sufficient particularity as to enable one skilled in the art to practice the invention, what is desired to be protected by letters patent is set forth in the following claims.

What is claimed is:

1. In ophthalmic quality lenses and lens blanks exhibiting local reversible, progressive variation in phototropic behavior, said lenses and lens blanks including a portion ultimately to serve as a distance portion and another portion ultimately to serve as a near portion, the distance portion and the near portion to be continuous with the near portion being below the distance portion when a lens made from a said lens blank is glazed in a frame, the reversible, progressive local variation in photochromic behavior being substantially more resistant to light transmission near an upper edge thereof and substantially less resistant to light transmission in the near portion when said lens is glazed in a frame, the transmission in light from the top of the lens to the bottom being substantially uniform laterally of a said lens when glazed, the improvement comprising said lens characterized by including a small, but effective, amount of cobalt oxide to thereby provide a lens characterized by a slight gray color in the unexposed state to a gray-brown color in the exposed state.

2. The lens according to claim 1 including cobalt oxide on an oxide basis, by weight, in the range 0.01 to 0.001 percent.

3. The lens according to claim 2 in which the cobalt oxide is present in a quantity of 0.007 weight percent.

4. Ophthalmic quality glass lenses of the type described in claim 1 characterized by color variation along the line 400 in FIG. 2 of the attached drawings.

* * * * *

UNITED STATES PATENT AND TRADEMARK OFFICE
CERTIFICATE OF CORRECTION

PATENT NO. : 4,080,051
DATED : March 21, 1978
INVENTOR(S) : David A. Krohn and Emil W. Deeg It is certified that error appears in the above-identified patent and that said Letters Patent are hereby corrected as shown below:

In column 1, line 47, amend "U.S. Pat. No. 3,197,396" to read --U.S. Pat. No. 3,197,296--.

In column 10, line 1, amend "FIG. 1" to read --FIG. 2--.

Signed and Sealed this

Tenth Day of July 1979

[SEAL]

Attest:

Attesting Officer

LUTRELLE F. PARKER
Acting Commissioner of Patents and Trademarks